United States Patent
Duron et al.

(10) Patent No.: US 8,217,757 B2
(45) Date of Patent: Jul. 10, 2012

(54) VOICE OVER RFID

(75) Inventors: Mark Duron, East Patchogue, NY (US); Thomas Wulff, North Patchogue, NY (US); Russell Calvarese, Stony Brook, NY (US); Robert Sandler, Melville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 678 days.

(21) Appl. No.: 11/960,871

(22) Filed: Dec. 20, 2007

(65) Prior Publication Data

US 2009/0160645 A1    Jun. 25, 2009

(51) Int. Cl.
*H04Q 5/22* (2006.01)
(52) U.S. Cl. ...................... 340/10.1; 455/517
(58) Field of Classification Search .......... 235/375–385; 340/500, 540, 568.1, 572.1–572.9, 10.1
See application file for complete search history.

(56) References Cited

U.S. PATENT DOCUMENTS

| | | | | |
|---|---|---|---|---|
| 5,153,918 A * | 10/1992 | Tuai | ............................. | 713/182 |
| 5,199,074 A * | 3/1993 | Thor | ............................. | 380/264 |
| 6,084,530 A * | 7/2000 | Pidwerbetsky et al. | ...... | 340/10.1 |
| 6,734,797 B2 * | 5/2004 | Shanks et al. | ............... | 340/572.4 |
| 6,995,673 B1 * | 2/2006 | Osredkar et al. | ............ | 340/572.1 |
| 7,072,686 B1 * | 7/2006 | Schrager | ..................... | 455/556.1 |
| 7,155,172 B2 * | 12/2006 | Scott | ................................ | 455/70 |
| 2005/0237157 A1 * | 10/2005 | Cooper et al. | ............... | 340/10.2 |
| 2006/0003785 A1 * | 1/2006 | Zatezalo | ....................... | 455/519 |
| 2006/0129308 A1 | 6/2006 | Kates | | |
| 2006/0267730 A1 * | 11/2006 | Steinke et al. | ............... | 340/10.1 |
| 2007/0018820 A1 | 1/2007 | Chand et al. | | |
| 2007/0066278 A1 | 3/2007 | Hong | | |
| 2007/0080930 A1 * | 4/2007 | Logan et al. | ................... | 345/156 |
| 2007/0159327 A1 * | 7/2007 | Belden et al. | ............... | 340/568.1 |

FOREIGN PATENT DOCUMENTS

WO    2009082619    7/2009

OTHER PUBLICATIONS

International Search Report and the Written Opinion of the International Searching Authority for International Application PCT/US2008/086072, mailed Feb. 9, 2009.

* cited by examiner

*Primary Examiner* — Brian Zimmerman
*Assistant Examiner* — James Yang (57) ABSTRACT

A wearable mobile computer communicates with a headset worn by an operator using a communication channel established between the computer and a radio frequency identification ("RFID") tag located in the headset. The headset may be configured for receive only (voice travels only from the computer to the headset) or configured for two-way voice communication. For two-way communication backscatter from the RFID tag is used to carry voice signals.

4 Claims, 7 Drawing Sheets

VOICE OVER RFID

BACKGROUND

The invention generally relates to voice communication using conventional RFID systems including RFID tags and interrogators.

RFID systems are well known. RFID systems are commonly utilized for product tracking, product identification, and inventory control in manufacturing, warehouse, and retail environments. RFID systems generally have two primary components: 1) a reader/writer (also known as an "interrogator"); and 2) an RFID tag (also known as a "transponder"). An RFID tag is a miniature device that is capable of responding, via variable reflectance of the radio frequency ("RF") signal generated by the interrogator. There are various tag configurations and arrangements. RFID tags are constructed to reflected an RF signal ("backscatter") back to the interrogator, a backscatter signal being detected by the interrogator. There are a variety of types of RFID systems useful for a various RFID applications. Various data communication protocols are used in RFID systems, depending on their application.

Passive transponders have no on-board battery. All energy required to operate the transponder is harvested from signals transmitted by the interrogator. Active tags have an on-board battery or use an external power source to power the tag's circuitry. In a typical application, the reflected (backscatter) or transponder RF signal is modulated in a manner that conveys identification data back to the interrogator. The identification data can then be stored, processed, displayed, or transmitted by the interrogator as needed.

Due to the size and complexity of the necessary components, fixed RFID interrogators mounted by doorways, loading docks, and assembly lines were the first to be developed and deployed in the field. As RFID technology matures and gains more widespread use in the data acquisition industry, there is increasing demand for mobile RFID interrogators. Integration of RFID interrogators into mobile computing devices is now beginning to take place.

Figure 1:
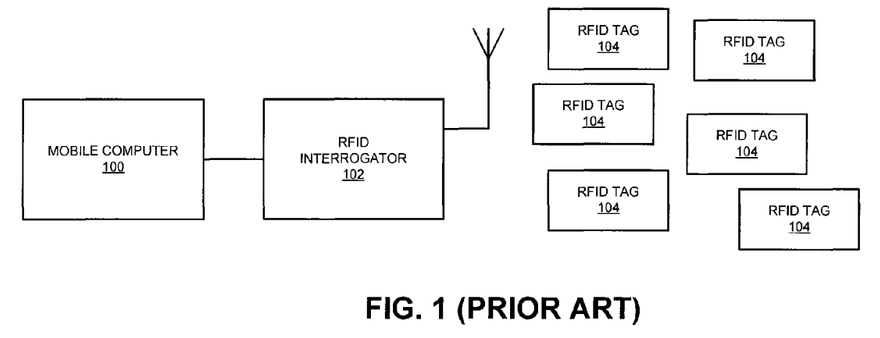
FIG. 1 (PRIOR ART) is a schematic diagram showing a prior art arrangement of a mobile computer linked to an RFID interrogator.
Figure 2:
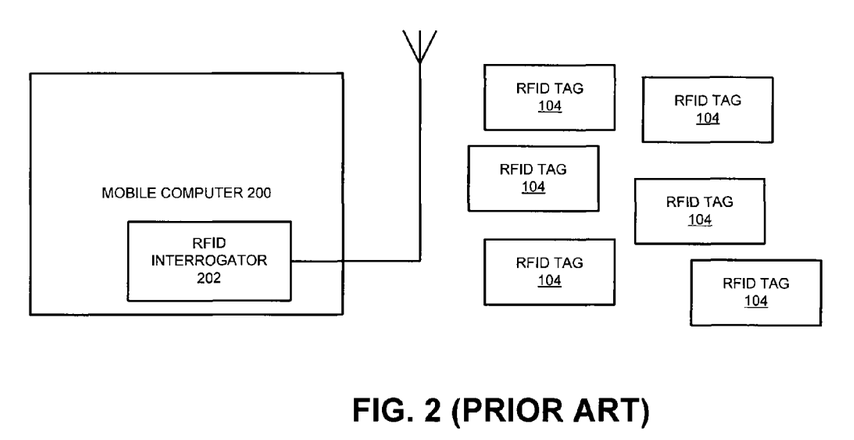
FIG. 2 (PRIOR ART) is a schematic diagram showing a prior art arrangement of a mobile computer having an integrated RFID interrogator.

The prior art is replete with mobile computing devices, including general purpose devices and devices that are designed to perform specific functions. Mobile computers intended for industrial, retail, shipping, and inventory applications are typically designed to be rugged, robust, and weatherproof. Such mobile computers are available from manufacturers such as Motorola, Inc. RFID interrogators were first associated with mobile computers as a physically separate device externally linked to the computer in order to provide RFID interrogator capabilities to the computer, such as shown in FIG. 1 (PRIOR ART). A mobile computer 100 is hard wired to an RFID interrogator 102 which interrogates a plurality of RFID tags 104. Now, RFID interrogators are being integrated into mobile computers themselves, such as shown in FIG. 2 (PRIOR ART). Mobile Computer 100 an incorporated therein an RFID interrogator 102.

Figure 3:
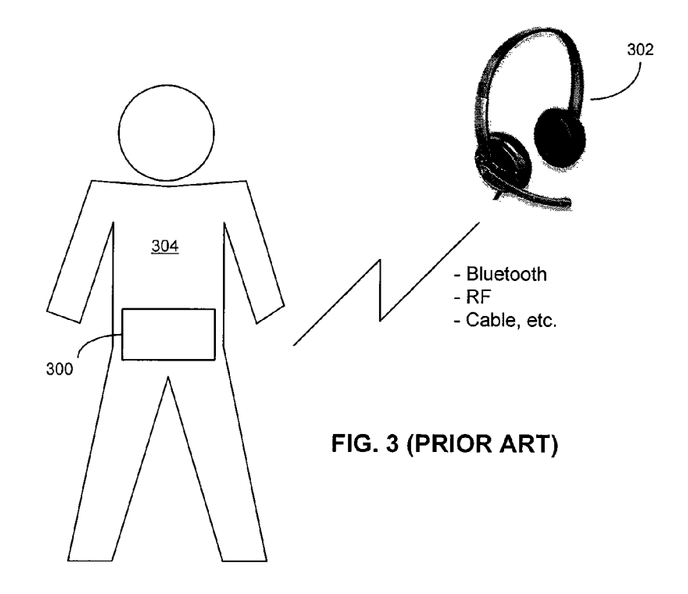
FIG. 3 (PRIOR ART) is a schematic diagram showing a prior art techniques for communicating between a headset and a computer.

Referring now to FIG. 3 (PRIOR ART), there are advantages to being able to provide voice communication between a mobile computer 300 and a headset 302 worn by an operator 304 of the mobile computer. There are ways to meet this need with known technology, such as, for example, cable with conventional audio circuitry, "Bluetooth" wireless technology and conventional radio frequency (RF) communication. Each of these techniques has its own set limitations and necessary design compromises.

The invention presented herein provides an alternative to these known techniques that is particularly useful in the case of a mobile computer having RFID capability communicating with a headset.

SUMMARY OF THE INVENTION

The invention relates generally to arrangements providing analog and/or digital voice communication using RFID system components that are generally used only to provide RFID tag information to an interrogator. More specifically, the invention provides communication between a headset and a mobile/wearable computer (hereinafter "mobile computer") having an integrated radio frequency identification ("RFID") interrogator and a RFID antenna. The headset is configured to include an RFID tag. The headset and mobile computer communicate voice messages using a communication channel established between the RFID interrogator integrated into the computer and the headset RFID tag.

In one embodiment of the inventions, voice communication occurs only from the mobile computer to the headset. In another embodiment, voice communication occurs bi-directionally between the mobile computer and the headset.

DETAILED DESCRIPTION

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Exemplary Operating Environment

Figure 4:
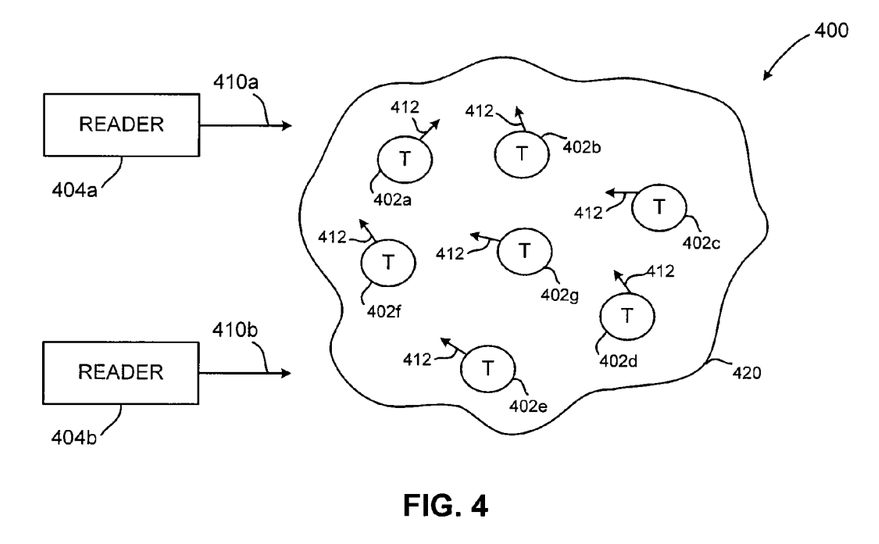
FIG. 4 is a schematic diagram illustrating an environment in which RFID readers communicate with an exemplary population of RFID tags.

Before describing embodiments of the inventions in detail, it is helpful to describe an example RFID communications environment in which the inventions may be implemented. FIG. 4 illustrates an environment 400 in which RFID tag readers 404 (readers 404a and 404b shown in FIG. 4) communicate with an exemplary population 420 of RFID tags 402. As shown in FIG. 4, the population 420 of tags includes seven tags 402a-402g. A population 420 may include any number of tags 402.

Environment 400 includes any number of one or more readers 404. For example, environment 400 includes a first reader 404a and a second reader 404b. Readers 404a and/or 404b may be requested by an external application to address the population of tags 420. Alternatively, reader 404a and/or reader 404b may have internal logic that initiates communication, or may have a trigger mechanism that an operator of a reader 404 uses to initiate communication. Readers 404a and 404b may also communicate with each other in a reader network (see FIG. 5).

As shown in FIG. 4, reader 404a "reads" tags 420 by transmitting an interrogation signal 410a to the population of tags 420. Interrogation signals may have signal carrier frequencies or may comprise a plurality of signals transmitted in a frequency hopping arrangement. Readers 404a and 404b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 420 may include tags 402 of various types, such as, for example, various classes of tags as enumerated above. Thus, in response to interrogation signals, the various tags 402 may transmit one or more response signals 412 to an interrogating reader 404. Some of the tags, for example, may respond by alternatively reflecting and absorbing portions of signal 404 according to a time-based pattern or frequency. This technique for alternatively absorbing and reflecting signal 404 is referred to herein as backscatter modulation. Typically, such backscatter modulation may include one or more alpha-numeric characters that uniquely identify a particular tag. Readers 404a and 404b receive and obtain data from response signals 412, such as an identification number of the responding tag 402. In the embodiments described herein, a reader may be capable of communicating with tags 402 according to various suitable communication protocols, including Class 0, Class 1, EPC Gen 2, other binary traversal protocols and slotted aloha protocols, and any other protocols mentioned elsewhere herein, and future communication protocols. Additionally, tag population 420 may include one or more tags having the packed object format described herein and/or one or more tags not using the packed object format (e.g., standard ISO tags).

Figure 5:
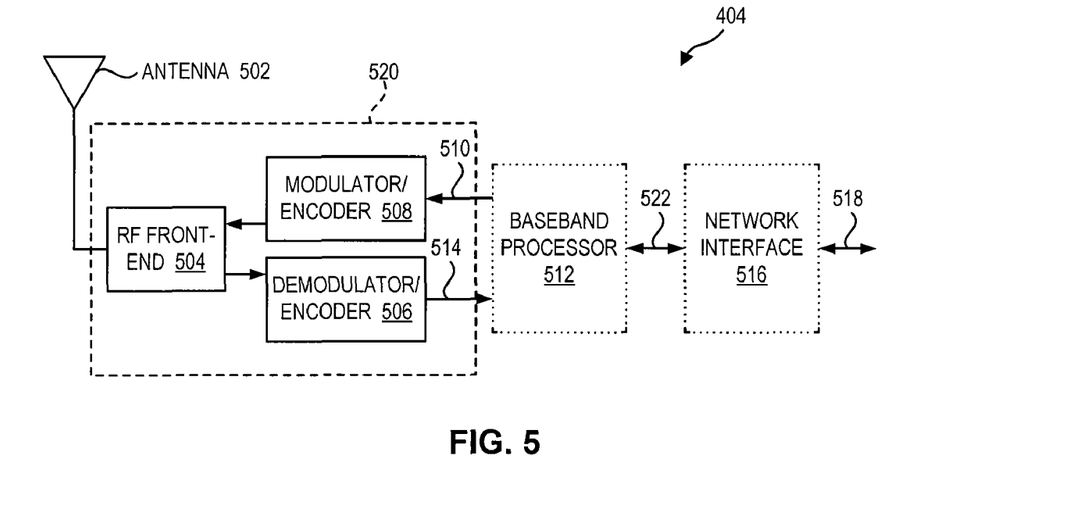
FIG. 5 is a block diagram of receiver and transmitter portions of an RFID reader.

FIG. 5 shows a block diagram of an example RFID reader 404. Reader 404 includes one or more antennas 502, a receiver and transmitter portion 520 (also referred to as transceiver 520), a baseband processor 512, and a network interface 516. These components of reader 404 may include software, hardware, and/or firmware, or any combination thereof, for performing their functions.

Baseband processor 512 and network interface 516 are optionally present in reader 404. Baseband processor 512 may be present in reader 404, or may be located remote from reader 404. For example, in an embodiment, network interface 516 may be present in reader 404, to communicate between transceiver portion 520 and a remote server that includes baseband processor 512. When baseband processor 512 is present in reader 404, network interface 516 may be optionally present to communicate between baseband processor 512 and a remote server. In another embodiment, network interface 516 is not present in reader 404.

In an embodiment, reader 404 includes network interface 516 to interface reader 404 with a communications network 518. As shown in FIG. 5, baseband processor 512 and network interface 516 communicate with each other via a communication link 522. Network interface 516 is used to provide an interrogation request 510 to transceiver portion 520 (optionally through baseband processor 512), which may be received from a remote server coupled to communications network 518. Baseband processor 512 optionally processes the data of interrogation request 510 prior to being sent to transceiver portion 520. Transceiver 520 transmits the interrogation request via antenna 502.

Reader 404 has at least one antenna 502 for communicating with tags 402 and/or other readers 404. Antenna(s) 502 may be any type of reader antenna known to persons skilled in the relevant art(s), including for example and without limitation, a vertical, dipole, loop, Yagi-Uda, slot, and patch antenna type.

Transceiver 520 receives a tag response via antenna 502. Transceiver 520 outputs a decoded data signal 514 generated from the tag response. Network interface 516 is used to transmit decoded data signal 514 received from transceiver portion 520 (optionally through baseband processor 512) to a remote server coupled to communications network 518. Baseband processor 512 optionally processes the data of decoded data signal 514 prior to being sent over communications network 518.

In embodiments, network interface 516 enables a wired and/or wireless connection with communications network 518. For example, network interface 516 may enable a wireless local area network (WLAN) link (including a IEEE 802.11 WLAN standard link), a BLUETOOTH link, and/or other types of wireless communication links. Communications network 518 may be a local area network (LAN), a wide area network (WAN) (e.g., the Internet), and/or a personal area network (PAN).

In embodiments, a variety of mechanisms may be used to initiate an interrogation request by reader 404. For example, an interrogation request may be initiated by a remote computer system/server that communicates with reader 404 over communications network 518. Alternatively, reader 404 may include a finger-trigger mechanism, a keyboard, a graphical user interface (GUI), and/or a voice activated mechanism with which a user of reader 404 may interact to initiate an interrogation by reader 404.

In the example of FIG. 5, transceiver portion 520 includes a RF front-end 504, a demodulator/decoder 506, and a modulator/encoder 508. These components of transceiver 520 may include software, hardware, and/or firmware, or any combination thereof, for performing their functions. Example description of these components is provided as follows.

Modulator/encoder 508 receives interrogation request 510, and is coupled to an input of RF front-end 504. Modulator/encoder 508 encodes interrogation request 510 into a signal format, such as, for example, one of pulse-interval encoding (PIE), FM0, or Miller encoding formats, modulates the encoded signal, and outputs the modulated encoded interrogation signal to RF front-end 504.

RF front-end 504 may include one or more antenna matching elements, amplifiers, filters, an echo-cancellation unit, a down-converter, and/or an up-converter. RF front-end 504 receives a modulated encoded interrogation signal from modulator/encoder 508, up-converts (if necessary) the interrogation signal, and transmits the interrogation signal to antenna 502 to be radiated. Furthermore, RF front-end 504 receives a tag response signal through antenna 502 and down-converts (if necessary) the response signal to a frequency range amenable to further signal processing.

Demodulator/decoder 506 is coupled to an output of RF front-end 504, receiving a modulated tag response signal from RF front-end 504. In an EPC Gen 2 protocol environment, for example, the received modulated tag response signal may have been modulated according to amplitude shift keying (ASK) or phase shift keying (PSK) modulation techniques. Demodulator/decoder 506 demodulates the tag response signal. For example, the tag response signal may include backscattered data formatted according to FM0 or Miller encoding formats in an EPC Gen 2 embodiment. Demodulator/decoder 506 outputs decoded data signal 514.

The configuration of transceiver 520 shown in FIG. 5 is provided for purposes of illustration, and is not intended to be limiting. Transceiver 520 may be configured in numerous ways to modulate, transmit, receive, and demodulate RFID communication signals, as would be known to persons skilled in the relevant art(s).

Figure 6:
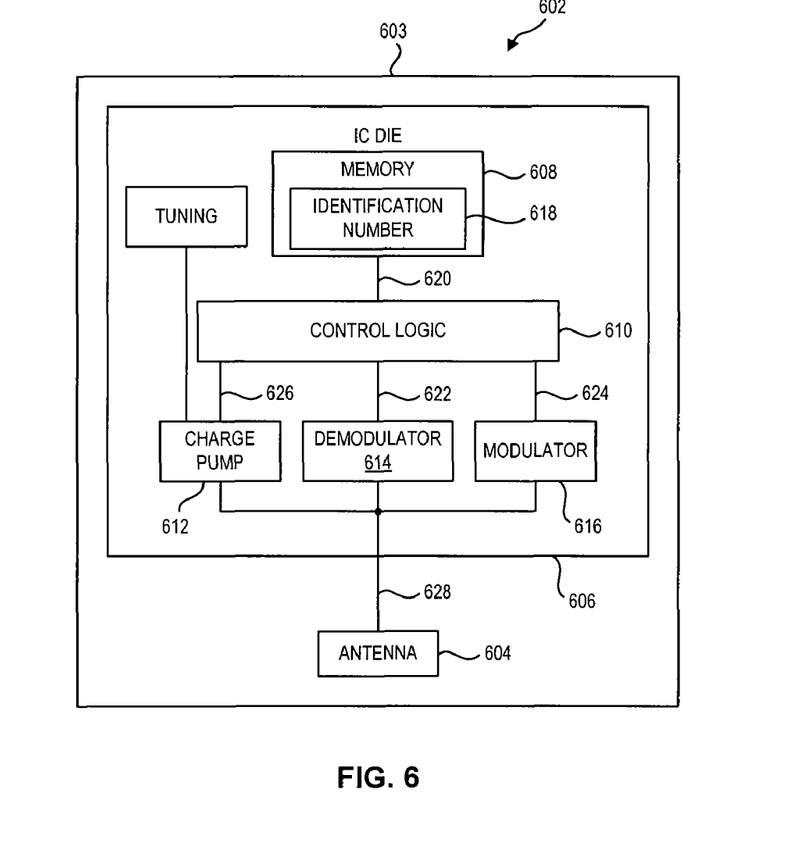
FIG. 6 is a block diagram of an exemplary radio frequency identification (RFID) tag.

The inventions described herein are applicable to any type of RFID tag. FIG. 6 is a schematic block diagram of an example radio frequency identification (RFID) tag 602. Tag 602 includes a substrate 603, an antenna 604, and an integrated circuit (IC) 606. Antenna 604 is formed on a surface of substrate 603. Antenna 604 may include any number of one, two, or more separate antennas of any suitable antenna type, including for example dipole, loop, slot, and patch. IC 606 includes one or more integrated circuit chips/dies, and can include other electronic circuitry. IC 606 is attached to substrate 603, and is coupled to antenna 604. IC 606 may be attached to substrate 603 in a recessed and/or non-recessed location.

IC 606 controls operation of tag 602, and transmits signals to, and receives signals from RFID readers using antenna 604. In the example of FIG. 6, IC 606 includes a memory 608, a control logic 610, a charge pump 612, a demodulator 614, and a modulator 616. Inputs of charge pump 612, and demodulator 614, and an output of modulator 616 are coupled to antenna 604 by antenna signal 628.

Demodulator 614 demodulates a radio frequency communication signal (e.g., interrogation signal) on antenna signal 628 received from a reader by antenna 604. Control logic 610 receives demodulated data of the radio frequency communication signal from demodulator 614 on an input signal 622. Control logic 610 controls the operation of RFID tag 602, based on internal logic, the information received from demodulator 614, and the contents of memory 608. For example, control logic 610 accesses memory 608 via a bus 620 to determine whether tag 602 is to transmit a logical "1" or a logical "0" (of identification number 618) in response to a reader interrogation. Control logic 610 outputs data to be transmitted to a reader (e.g., response signal) onto an output signal 624. Control logic 610 may include software, firmware, and/or hardware, or any combination thereof. For example, control logic 610 may include digital circuitry, such as logic gates, and may be configured as a state machine in an embodiment.

Modulator 616 is coupled to antenna 604 by antenna signal 628, and receives output signal 624 from control logic 610. Modulator 616 modulates data of output signal 624 (e.g., one or more bits of identification number 618) onto a radio frequency signal (e.g., a carrier signal transmitted by reader 604) received via antenna 604. The modulated radio frequency signal is response signal 412 (see FIG. 4), which is received by reader 404. In one example embodiment, modulator 616 includes a switch, such as a single pole, single throw (SPST) switch. The switch is configured in such a manner as to change the return loss of antenna 604. The return loss may be changed in any of a variety of ways. For example, the RF voltage at antenna 604 when the switch is in an "on" state may be set lower than the RF voltage at antenna 604 when the switch is in an "off" state by a predetermined percentage (e.g., 30 percent). This may be accomplished by any of a variety of methods known to persons skilled in the relevant art(s).

Charge pump 612 (or other type of power generation module) is coupled to antenna 604 by antenna signal 628. Charge pump 612 receives a radio frequency communication signal (e.g., a carrier signal transmitted by a reader) from antenna 604, and generates a direct current (DC) voltage level that is output on tag power signal 626. Tag power signal 626 powers circuits of IC die 606, including control logic 620.

Charge pump 612 rectifies a portion of the power of the radio frequency communication signal of antenna signal 628 to create a voltage power. Charge pump 612 increases the voltage level of the rectified power to a level sufficient to power circuits of IC die 606. Charge pump 612 may also include a regulator to stabilize the voltage of tag power signal 626. Charge pump 612 may be configured in any suitable way known to persons skilled in the relevant art(s). For description of an example charge pump applicable to tag 602, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 612 is provided below.

It will be recognized by persons skilled in the relevant art(s) that tag 602 may include any number of modulators, demodulators, charge pumps, and antennas. Tag 602 may additionally include further elements, including an impedance matching network and/or other circuitry. Furthermore, although tag 602 is shown in FIG. 6 as a passive tag, tag 602 may alternatively be an active tag (e.g., powered by battery).

Memory 608 is typically a non-volatile memory, but can alternatively be a volatile memory, such as a DRAM. Memory 608 stores data, including an identification number 618. In a Gen-2 tag, tag memory 608 may be logically separated into four memory banks.

Voice Over RFID

Figure 7:
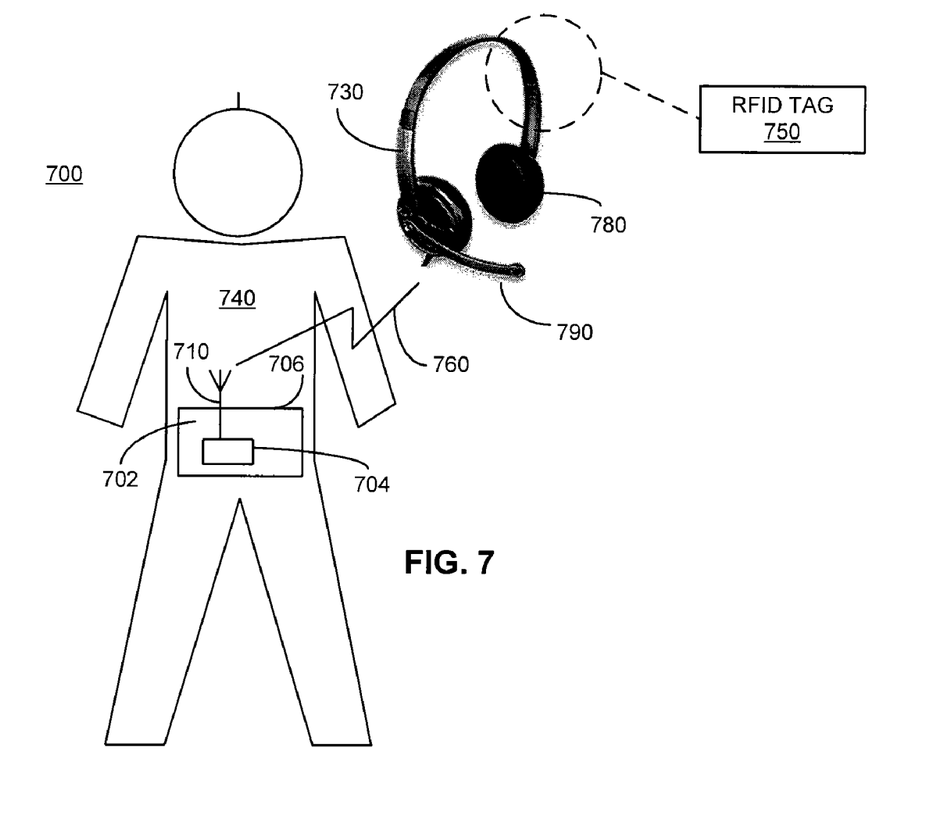
FIG. 7 is a schematic diagram illustrating a general concepts of the inventions.
Figure 8:
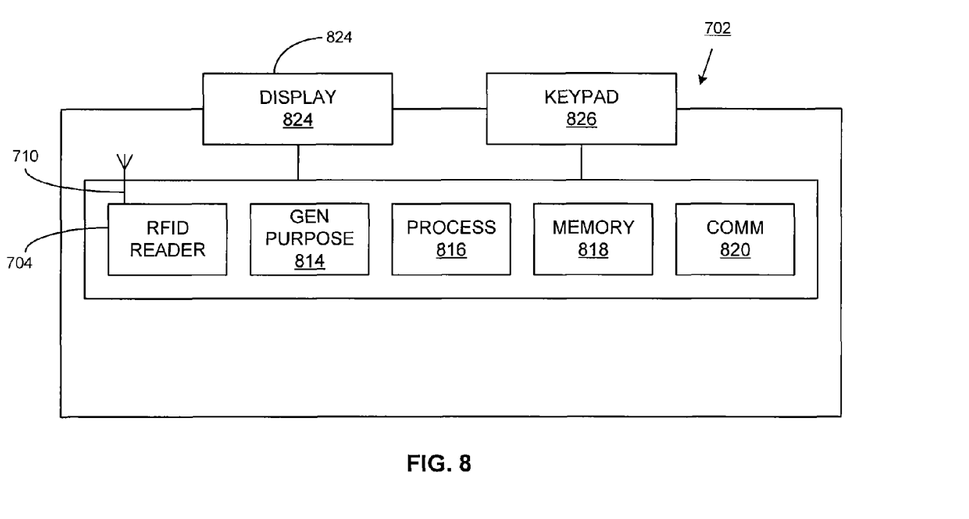
FIG. 8 is a block diagram of computer 700 shown generally in FIG. 7.

FIG. 7 is a diagram illustrating a general configuration 700 of the invention for communicating between a mobile/wearable computer 702 and a headset 730. A mobile/wearable computer 702 (hereinafter "mobile computer"), configured in accordance with an exemplary embodiment of the invention, supports general purpose operations along with RFID operations. A block diagram of computer 702 is shown in FIG. 8. Computer 702 incorporates an internally integrated RFID interrogator 704 and an RFID antenna 710. In the exemplary embodiment, the RFID antenna 710 is fully integrated within a housing 706 of mobile computer 702.

Headset 730 is provided for a person 740 operating mobile computer 702. Headset 730 includes speaker transducers 780 and a microphone 790. Headset 730 also includes an RFID tag 750 that is used to communicate with mobile computer 702. Although an RFID tag, such as RFID tag 750, is typically used to transmit data identifying some product or service with which the RFID tag is associated, in this application the RFID tag communication channel, generally indicated by 760, is used to carry voice messages or data between headset 730 and mobile computer 702.

FIG. 8 is a block diagram of computer 702 shown generally in FIG. 7. In addition to the RFID antenna 710 and RFID interrogator 704 already mentioned, it may include general purpose sub-module 814, a processor 816, memory 818, communications module 820, a display 824, and a keypad 826 integrated into housing 706 (not shown in FIG. 8). FIG. 8 depicts mobile computer 702 in an over simplified manner, and a practical embodiment will of course include many additional features and components. For example, mobile computer 702 may include a touch panel or other input/output elements. Display 824 and keypad 826 function as input/output elements for the operator of mobile computer 702. Display 824 and keypad 826 may be coupled to appropriate input/output drivers as necessary to support input/output functions in a conventional manner. In practical embodiments, hardware elements of computer 702 may be physically realized as an integrated component, board, card, or package mounted within housing 706. The distinct functional blocks of FIG. 8 are useful for purposes of description. In practical embodiments, the various sub-modules and functions need not be distinct physical or distinct functional elements. In other words, these (and other) functional modules of mobile computer 702 may be realized as combined processing logic, a single application program, or the like.

RFID interrogator 704 is suitably configured to support RFID functions of mobile computer 702. In this regard, RFID interrogator 704 may include an RFID interrogator transceiver that generates RFID interrogation signals and receives reflected RFID signals generated by RFID tags in response to the interrogation signals. In the example embodiment described herein, RFID interrogator 704 is designed to operate in the UHF frequency band designated for RFID systems. Alternate embodiments may instead utilize the High Frequency band or the Low Frequency band designated for RFID systems. The operation of RFID interrogators and RFID transceivers are generally known and, therefore, will not be described in detail herein. Notably, in this example embodiment, RFID interrogator 704, RFID antenna 710, and all RFID components of mobile computer 702 are enclosed within housing 706 and these internal RFID components are inaccessible unless housing 706 is broken or disassembled.

General purpose module 814 is responsible for handling non-RFID functions of mobile computer 702. For example, general purpose module 814 may include a wireless data communication element that supports bi-directional wireless data transfer using suitable wireless data transmission protocols and methodologies. In such a deployment, RFID antenna 710 may be tuned and positioned to avoid RF interference with the wireless data communication elements. Alternatively (or additionally), general purpose module 814 may be configured to support data communication over physical connections. As another example, general purpose sub-module 814 may be configured to support data capture functions of mobile computer 702, where such data capture functions include one or more of: bar code reading; imaging; magnetic stripe reading; GPS data receiving; and IrDA. These data capture modes can be utilized to support traditional uses of mobile computer 702, e.g., inventory control, tracking of packages, retail checkout, rental car returns, and other applications. Although not separately depicted in FIG. 8, mobile computer 702 may include a data capture sub-module that is configured to support such data capture modes. Of course, RFID antenna 710 may also be tuned and positioned to avoid RF interference with the data capture sub-module.

Processor 816 may be any general purpose microprocessor, controller, or microcontroller that is suitably configured to control the operation of mobile computer 702. In practice, processor 816 may execute one or more software applications that provide the desired functionality for mobile computer 702. Memory 818 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, memory 818 is capable of storing RFID data captured by RFID interrogator 704 while mobile computer 702 is operating in the RFID interrogator mode.

Data communication module 820 is configured to support data communication functions of mobile computer 702. Although depicted as a distinct sub-module, data communication module 820 may be realized as a portion of general purpose module 814. Data communication module 820 may be configured to communicate with another computing device, a network server, a peripheral device, or the like. In connection with the RFID operating mode, data communication module 820 may transmit the collected RFID data to a remote computing device in accordance with at least one data communication protocol. In a practical embodiment, mobile computer 702 may utilize one or more standardized data communication protocols (either wireless or wired). Such standardized data communication protocols include, without limitation: Bluetooth; IEEE 802.11 (any variation thereof); Ethernet; IEEE 1394 (Firewire); GPRS; USB; IEEE 802.15.4 (ZigBee); IEEE 802.16 (WMAN); or IrDA (infrared). Moreover, data communication module 820 may be realized with hardware, software, and/or firmware using known techniques and technologies. For example, mobile computer 702 may include a wireless port configured to support wireless data communication and/or a cable or wire port configured to support data communication via a tangible link.

A mobile computing device according to the invention is capable of functioning in one or more conventional modes and/or an RFID interrogator mode. The primary functions of the mobile computing device need not be limited to data capture and RFID tag interrogation. Rather, the mobile computing device is capable of multi-tasking and multi-functioning.

The mobile computer includes an RFID radio which is used to communicate with an RFID tag located in the headset. In the case of a headset configured for receive only (information that would normally be broadcast from the mobile computer's speaker), there is no transmitter in the headset other than the RFID tag located in the headset. There is a microphone in the headset which has a data path connected to the embedded RFID tag.

The RFID radio in the mobile computer and RFID tag located in the headset are configured to communicate over a radio communication channel. Channels that could be used for such purpose include the 900 MHz channel and the 2.5 GHz channel. Others could be used as well. In some applications the 900 MHz channel is preferred to avoid interference with 802.11 signals that may be present in co-located wireless networks.

Figure 9:
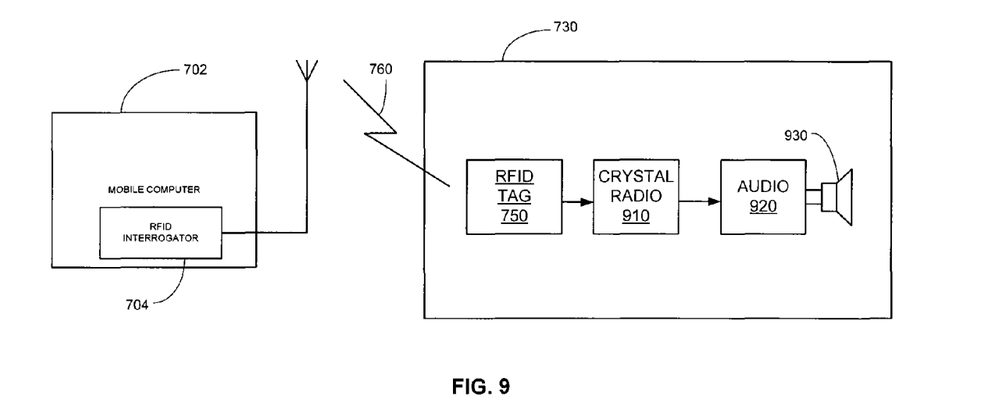
FIG. 9 is a block diagram illustrating in general how voice communication from the mobile computer to the headset is carried out.

FIG. 9 is a block diagram of an embodiment of the invention illustrating in general how voice signals are communicated from mobile computer 702 to headset 730. Headset 730 is configured so as to include an RFID tag 750 and a AM radio type receiver 910. The "front end" of the RFID tag 750 is constructed and arranged so as to be the front end of the AM radio receiver. As an alternative, a separate front end can be provided for AM radio receiver 910. The voice signals communicated from mobile computer 702 to headset 730 can be analog or digital with appropriate coding/decoding and modulation schemes. Audio circuit 920 processes demodulated voice signals from AM radio receiver 910 and drives a speaker transducer 930.

Figure 10:
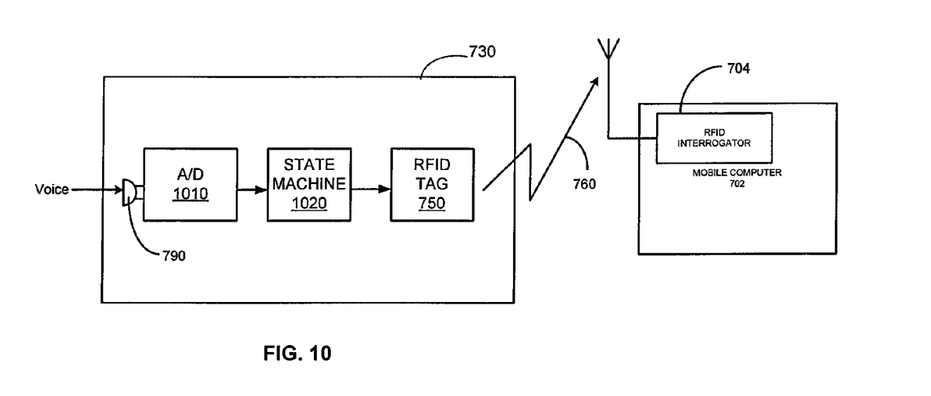
FIG. 10 is a block diagram illustrating in general how voice communication from the headset to the mobile computer is carried out.

FIG. 10 is a block diagram illustrating in general how voice signals are communicated from headset 730 to mobile computer 702 is carried out. The voice of operator 740 (see FIG. 7) is captured by microphone 790. After being amplified and signal converted, the voice signal is digitized by an A/D converter 1010. A state machine 1020 modulates the digitized voice signal onto a backscatter signal from RFID tag 750 to mobile computer 702.

Figure 11:
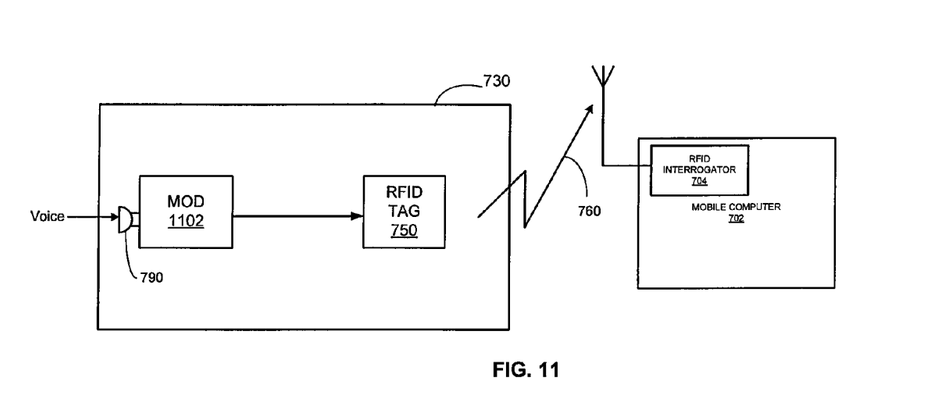
FIG. 11 is a block diagram of an embodiment of an arrangement for voice communication from a headset to the mobile computer.

FIG. 11 is a block diagram of another embodiment of an arrangement facilitating voice communication from headset 730 to mobile computer 702. The voice of operator 740 is captured by microphone 790. After being amplified and signal converted as necessary, the voice signal is coupled to a modulator 1102 which modulates a signal emitted by RFID tag 750, such as, for example, a backscatter signal. The RFID tag signal is received by interrogator 704 integrated into computer 702. This embodiment is particularly useful for analog modulation of the voice signal onto the RFID tag signal.

In an alternative embodiment, headset 730 includes a transmitter configured to transmit voice data to mobile computer 702 via RFID radio. Full duplex communication can be interleaved with backscatter from RFID tag 750. Information can be sent from the mobile computer to the headset in an initial carrier signal portion of an RFID radio transmission to enable voice communication.

Analog Communication Embodiment

Figure 12:
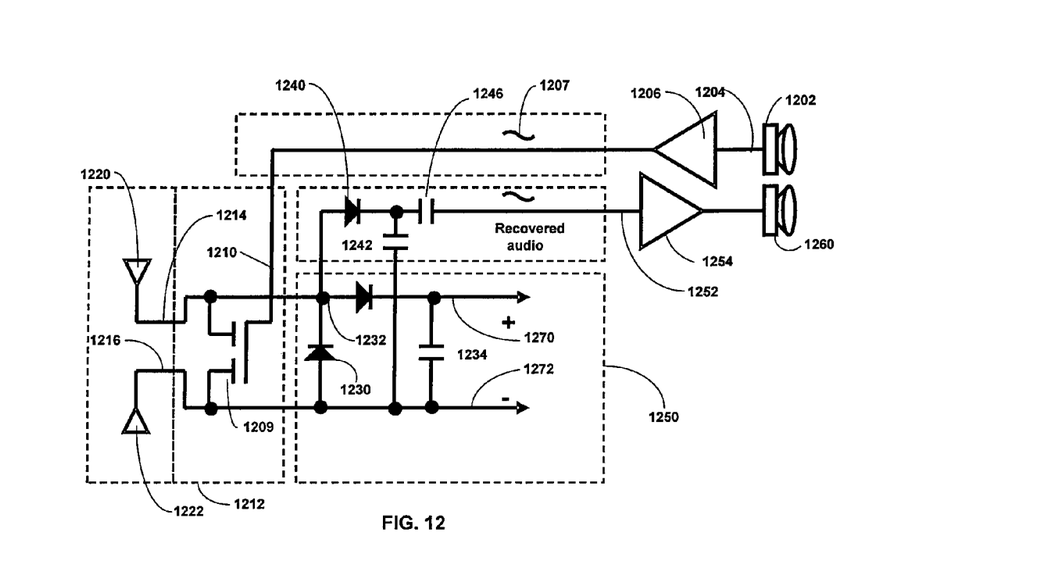
FIG. 12 is a schematic diagram of an embodiment of the invention constituting a analog implementation of full duplex communication.

FIG. 12 is a schematic diagram of an embodiment of the invention constituting a analog implementation that provides full duplex communication. A microphone 1202 captures an operator's voice and generates an analog voice signal at 1204 indicative thereof. The analog voice signal at 1204 is amplified by an amplifier 1206 to provide an amplified analog voice signal 1207. Amplified analog voice signal 1207 is coupled to a node of a FET 1209 which constitutes an input 1210 of an impedance modulator 1212. Impedance modulator 1212 can be the impedance modulator of an RFID tag or it can be a similar circuit. Outputs 1214 and 1216 of impedance modulator 1212 are coupled respectively to antenna elements 1220 and 1222. A modulated backscatter signal is transmitted back to an interrogator (not shown) in response to an interrogation signal.

Audio information being sent by an interrogator to the headset is modulated onto an interrogator signal that is captured by antennas 1220 and 1222.

A detector and power supply 1250 including diodes 1230 and 1232 and a capacitor 1234 provides power at nodes 1270 and 1272 and detects audio information modulated onto a signal from an interrogator. Signals from antenna elements 1220 and 1222 are combined by a diode 1230 providing a summed signal at node 1232. The signal at node 1232 is filtered by a diode 1240 and capacitors 1242 and 1246 to provide a recovered analog audio signal at 1252 to an amplifier 1254. An output of amplifier 1254 drives speaker 1260. Thus, an operator can carry on a two-way conversation using the interrogator signal and backscatter signal of an RFID tag circuit.

Digital Communication Embodiment

Figure 13:
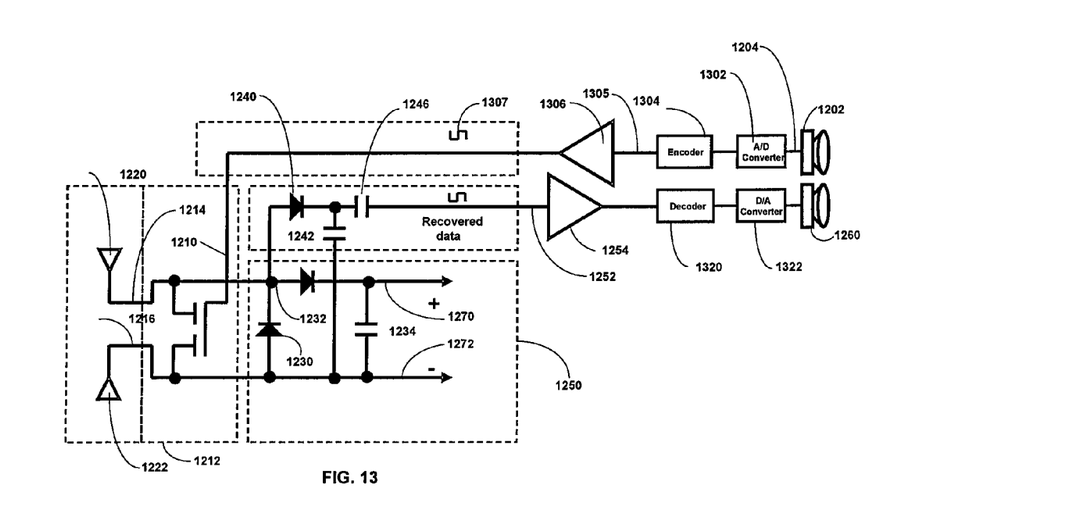
FIG. 13 is a schematic diagram of an embodiment of the invention constituting a digital implementation of full duplex communication.

FIG. 13 is a schematic diagram of an embodiment of the invention constituting a digital implementation that provides full or half duplex communication. Most of the components of this embodiment are the same or correspond to components shown in the FIG. 12 embodiment. Like or corresponding parts to those shown in FIG. 12 are, for the most part, not described. However there are differences from the analog approach taken in FIG. 12 to the digital approach shown in FIG. 13. An operator's voice captured by microphone 1202 generates an analog voice signal at 1204 indicative thereof. The analog voice signal at 1204 is sampled and digitized by an A/D converter 1302 and encoded by an encoder 1304. Encoded digitized signals at the output 1305 of encoder 1304 are amplified by amplifier 1306. The output of amplifier 1306 is a data stream 1307. The data stream (digital) is coupled to input 1210 of impedance modulator 1212 so as to modulate a backscatter signal responsive to an interrogator signal. A modulated backscatter signal is transmitted back to an interrogator (not shown) in response to an interrogation signal.

Digitized audio information sent by an interrogator to the headset is modulated onto an interrogator signal that is captured by antennas 1220 and 1222. Signals from antennas 1220 and 1222 are combined by diode 1230 providing a summed signal at node 1232. The signal at node 1232 is filtered by a diode 1240 and capacitors 1242 and 1246 to provide a recovered digital audio signal at an input 1252 to an amplifier 1254. An output of amplifier 1254 is coupled to a decoder 1320, the digital output of which drives a D/A converter 1322 to generate an analog signal for driving speaker 1260.

Conclusion

In the U.S. RFID generally uses fifty (50) defined communication channels. Forty (40) of these channels are required to be used by the Federal Communications Commission (FCC). This leaves 10 channels that can be allotted for communication of voice data from the headset to the mobile computer for embodiments incorporating two way voice communication between the mobile computer and headset.

Using the principles of the invention, a wearable mobile computer establishes voice communication with a headset worn by an operator. Communication occurs using a communication channel established between the computer and a radio frequency identification ("RFID") tag located in the headset. The headset may be configured for receive only (voice travels only from the computer to the headset) or configured for two-way voice communication. For two-way communication backscatter from the RFID tag (in response to an interrogation signal) is used to carry voice signals.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. A headset for live two-way voice communications, comprising:
    a radio frequency identification (RFID) tag on the headset constructed and arranged to receive an RFID interrogation signal modulated with a live voice signal;
    a demodulator on the headset constructed and arranged to demodulate the live voice signal;
    audio processing circuits on the headset constructed and arranged to amplify the live voice signal;
    a transducer on the headset for producing an audible signal from the amplified live voice signal;
    a microphone for capturing a second live audio voice signal from a user of the headset in response to the amplified live voice signal; and
    means for modulating the second live audio voice signal onto a radio frequency signal emitted by the RFID tag on the headset.

2. A headset according to claim 1 wherein the demodulator comprises an AM radio.

3. A headset according to claim 1 wherein the live second audio voice signal is interleaved with a backscatter signal from the RFID tag.

4. A headset for live two-way voice communications, comprising:
    a radio frequency identification (RFID) tag on the headset constructed and arranged to receive an RFID interrogation signal and a live voice signal modulated on the RFID interrogation signal;
    a microphone on the headset for capturing a second live audio voice signal in response to the live voice signal; and
    a modulator on the headset for modulating the second live audio voice signal onto a backscatter signal of the RFID tag sent in response to the RFID interrogation signal.

* * * * *

UNITED STATES PATENT AND TRADEMARK OFFICE
CERTIFICATE OF CORRECTION

| | |
|---|---|
| PATENT NO. | : 8,217,757 B2 |
| APPLICATION NO. | : 11/960871 |
| DATED | : July 10, 2012 |
| INVENTOR(S) | : Duron et al. |

It is certified that error appears in the above-identified patent and that said Letters Patent is hereby corrected as shown below:

In Column 3, Line 29, delete "402ah-402g." and insert -- 402a-402g. --, therefor.

In Column 5, Line 35, delete "FMO" and insert -- FM0 --, therefor.

Signed and Sealed this
Eighth Day of January, 2013

David J. Kappos
*Director of the United States Patent and Trademark Office*